US010002481B2

(12) United States Patent
Seibel et al.

(10) Patent No.: US 10,002,481 B2
(45) Date of Patent: Jun. 19, 2018

(54) VOTE CASTING SYSTEM AND METHOD

(71) Applicants: John L. Seibel, Bethesda, MD (US);
Nicholas Koumoutseas, Rockville, MD (US)

(72) Inventors: John L. Seibel, Bethesda, MD (US);
Nicholas Koumoutseas, Rockville, MD (US)

( * ) Notice: Subject to any disclaimer, the term of this patent is extended or adjusted under 35 U.S.C. 154(b) by 0 days. days.

(21) Appl. No.: 15/332,825

(22) Filed: Oct. 24, 2016

(65) Prior Publication Data
US 2018/0114391 A1   Apr. 26, 2018

(51) Int. Cl.
*G06K 17/00* (2006.01)
*G07C 13/00* (2006.01)
*G06K 19/06* (2006.01)
*G06K 7/14* (2006.01)

(52) U.S. Cl.
CPC ........... *G07C 13/00* (2013.01); *G06K 7/1417* (2013.01); *G06K 19/06037* (2013.01)

(58) Field of Classification Search
USPC .............................................. 235/386; 705/12
See application file for complete search history.

(56) References Cited

U.S. PATENT DOCUMENTS

| 2011/0053559 A1* | 3/2011 | Klein | G07C 13/00 455/411 |
| 2012/0239464 A1* | 9/2012 | Vicari | G06Q 10/10 705/12 |
| 2014/0012635 A1* | 1/2014 | Joyce | G07C 13/00 705/12 |

* cited by examiner

*Primary Examiner* — Ahshik Kim
(74) *Attorney, Agent, or Firm* — Dickinson Wright, PLLC

(57) ABSTRACT

A voting system is provided that results in more efficient voting and more time for voter's to consider and make voting selections. Voter's use an interactive device to obtain a ballot and to make vote selections on the ballot. A machine readable vote selection code is generated and output to a paper or a display device. The machine readable vote selection code is read at a polling location to fill in a ballot on a voting machine, and output a human readable ballot. The voter verified the votes match the voter's intent, and the voted ballot/receipt is accepted.

23 Claims, 8 Drawing Sheets

VOTE CASTING SYSTEM AND METHOD

FIELD OF THE INVENTION

The present invention is related to voting systems. More particularly, the present invention relates to an improved method and system for selecting votes on a ballot before arriving at a polling location, or at the voting location, and generating a code capable of conveying vote information of the ballot to a polling system at the polling location, thereby making the voting process at the polling location faster, more accurate, more transparent and more efficient.

BACKGROUND OF THE INVENTION

One of the significant problems in modern elections (see, for example, the 2012 presidential election) is that voters often have to wait in long lines to cast their votes. Lines are often slow and patience is required in some places. The upshot and result is that an inestimable number of people either leave before casting a ballot or fail to vote. This is an unacceptable consequence.

Absentee and early voting is a poor substitute, since these voters ballots are cast before the designated election day, such that they necessarily miss out on information about issues and candidates that come up late in an election cycle. In addition, in many jurisdictions absentee ballots are treated as provisional ballots and not counted unless a particular issue or race is very close. In many places absentee votes are not counted unless they could make a difference. In other places, rigorous conditions must be met before absentee voters are counted. Often these conditions present traps for the unwary.

Voting on the internet may alleviate some of the problems with wait times and long lines at a polling location. However, internet voting presents significant challenges, some of which may be overcome, and some of which are inherent in the medium. Internet voting requires a tradeoff of either anonymity (the vote and voter ID remain locked together although allegedly separated by an encryption wall) or transparency (there is only an electronic record of the vote). Voting in a public polling location remains preferable to internet voting in most situations despite potentially waiting in line because voting in a secure public polling location with a private voting space eliminates coercion by others, thus ensuring votes cast are actually those intended by the voters.

Today's reality is that the number of mobile devices is proliferating, and the trend shows all signs of continuing or accelerating. There is a proliferation of web connected cell phones, tablets and the like. Internet access is available, usually for free, in a large number of business establishments (e.g. Starbucks, McDonalds). Internet connected computers in homes and wireless internet access are ubiquitous in many places, particularly densely populated places.

Smart phones and similar devices provide interactive devices for users. Interactivity, when used in a relaxed environment can help the voter navigate, and prevent many voter errors. The combination of interactivity with readily available internet access provides a potentially powerful combination. Interactivity can be used to inform voters as they engage in the process. A voter who can conduct research as he/she is actually filling out a ballot is a more informed voter. Informed voters are the core of democracy.

Interactivity can also provide significant capability to disabled voters. Many disabled voters will have their own interactive device. If the voter does not have an interactive, web enabled device, they can be set up at the poll site, with HAVA compliant capabilities.

In all cases, today's electronic/interactive voting has significant limitations.

Transparency is limited since there are only records in a database. As a practical matter there is no way to confirm that votes were cast as intended or counted as cast. Voter verifiable receipts are difficult and cumbersome, and on-site voting machines are inherently inefficient. For every second that someone is using a voting machine, everyone else is precluded from doing so.

On-site, fully electronic voting machines are so inefficient that certain compromises are already made in the process to try to speed the casting of votes. Most fully electronic systems that are used at poll sited do not warn voters of "undervotes" (i.e. failing to vote in a race). For all of these reasons, there is a need for a new method of filling out ballots and casting votes that takes advantage of interactive devices such as smart phones in order to improve the voter experience, improve vote accuracy and transparency, and reduce or eliminate wait times at polling locations while maintaining the inherent benefits of public polling places with private vote casting booths.

SUMMARY OF THE INVENTION

The present invention overcomes the above described disadvantages and provides numerous additional improvements and benefits as will be readily appreciated by those of ordinary skill in the art. Embodiments of the present invention provide a system and method for providing an interactive ballot worksheet (EBS) on an internet capable interactive device such as a mobile phone. The system and method further enables filling out the Electronic ballot worksheet at the user's leisure, and once the electronic ballot worksheet is completed, the system and method provide for preparing a code, such as a QR code that contains the completed ballot choices and any related data. The QR code may be printed onto paper or stored on the mobile device for display at a polling location. The system and method further includes a code reader located at a polling location, preferably incorporated into the vote recordation device/voting machine. The code reader reads the code presented by the user and generates a filled out paper or electronic ballot on the polling location voting machine, with the user's vote selections filled in. The printed ballot may include its own readable code such as a QR code that digitally represent the marks made on the ballot. The user may then verify that the desired vote selections are in fact selected, accept and quickly and easily cast the vote. As a result the polling location voting process may be very quick, and efficiency at the polling location is greatly increased, the accuracy of the vote is verified by the voter, ballot transparency is improved, while at the same time each voter can take significantly longer to consider and make vote selections on his or her own time.

Further aspects of the invention may include the code reader checking the QR code to determine if the voter is attempting to cast their ballot at an appropriate polling location. In one embodiment ballot readers at the polling location may be programmed to only accept ballots appropriate for that polling locations, and provide an alert if the QR code represents a ballot that should not be accepted at that polling location. In another embodiment, the ballot readers at various polling location may be programmed to permit the voter to vote in any of the polling locations. The system and method may further verify that vote selections by the user are not over-voted or under-voted.

These and other aspects of the invention will be better understood with reference to the drawings and detailed description of exemplary embodiments of the present invention presented herein.

BRIEF DESCRIPTION OF THE DRAWINGS

The various objects, advantages and novel features of the present invention will be more readily understood from the following detailed description when read in conjunction with the appended drawings, in which.

Throughout the drawings, like reference numerals will be understood to refer to like elements features or structures.

DETAILED DESCRIPTION OF THE PREFERRED EMBODIMENTS

Exemplary embodiments of the present invention take advantage of the proliferation of Internet connected devices or any other computer to ameliorate waiting to vote, provide interactivity to prevent voter error, while at the same time protecting the transparency of the process and result. With this system, the time that voters take to fill out the ballot (i.e. make their choices) is offloaded to any interactive device, but the voter still advantageously renders the choices to a human readable (but digitally processable) form and then deposits the human readable form, preferably along with electronic record of the choices. In a preferred embodiment, the voter can render and deposit his/her vote only after being authenticated.

As a fundamental matter, the system requires a shift in the consideration of the voting process. The current and usual process restricts access to the ballot, as its primary protection of the ballot box. People cannot obtain a ballot until they are authenticated as eligible.

This system preferably restricts access to the ballot box and the deposit of the ballot by the voter. Any person may obtain, fill out and make choices on a ballot, but his or her ability to "cast" the ballot is preferably limited to those who are authenticated as an eligible voter (registered and not previously receipted). In other words, there is no limitation in access to the ballot and the choices, there is only a limitation on "casting" the ballot, or the ability to make those choices part of the electoral poll of valid votes. An alternate embodiment would still restrict voters from obtaining a ballot until properly authenticated at a poll site, as is done currently.

Figure 1:
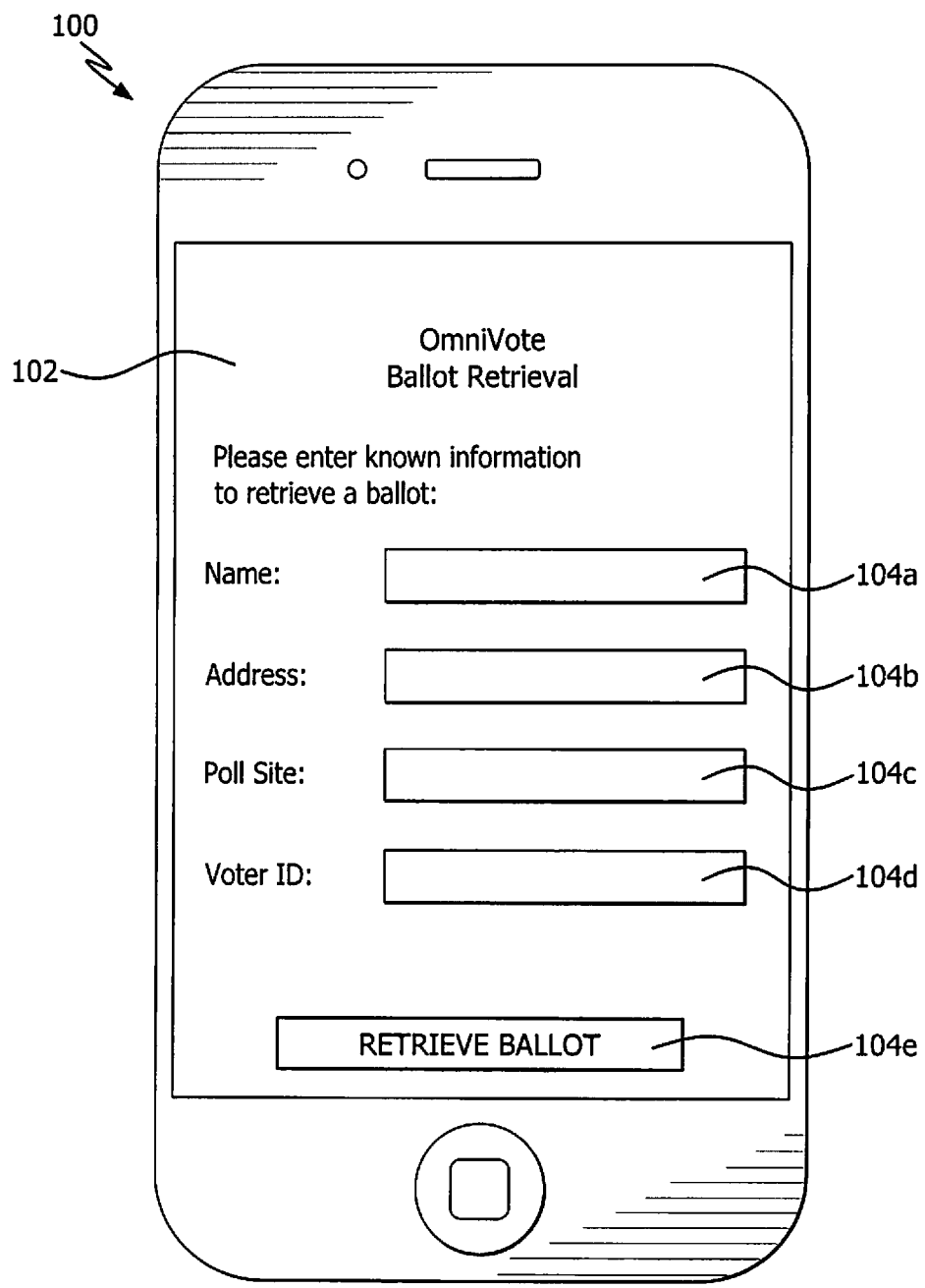
FIG. 1 illustrates a ballot retrieval interface on a device according to an exemplary embodiment of the invention.
Figure 2:
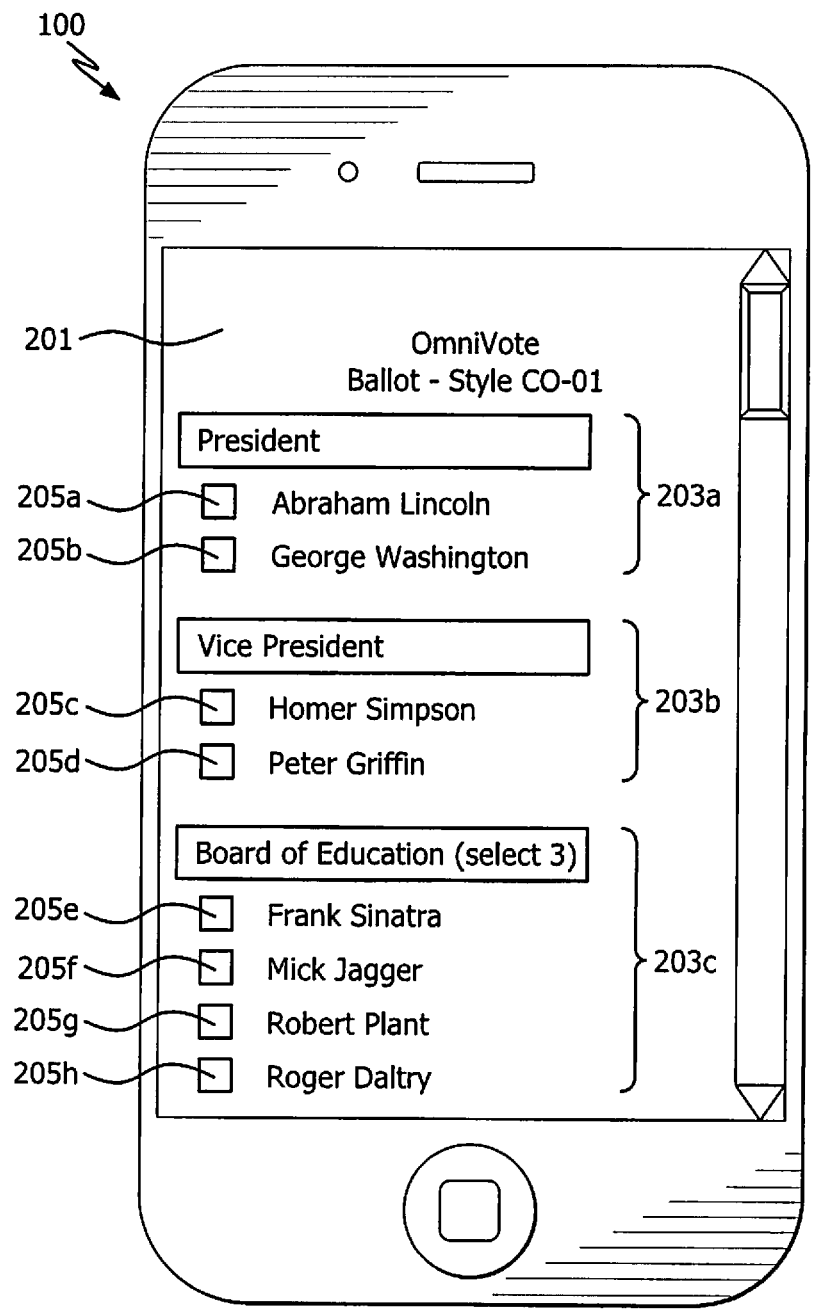
FIG. 2 illustrates a ballot completing interface on a device according to an exemplary embodiment of the invention.
Figure 3:
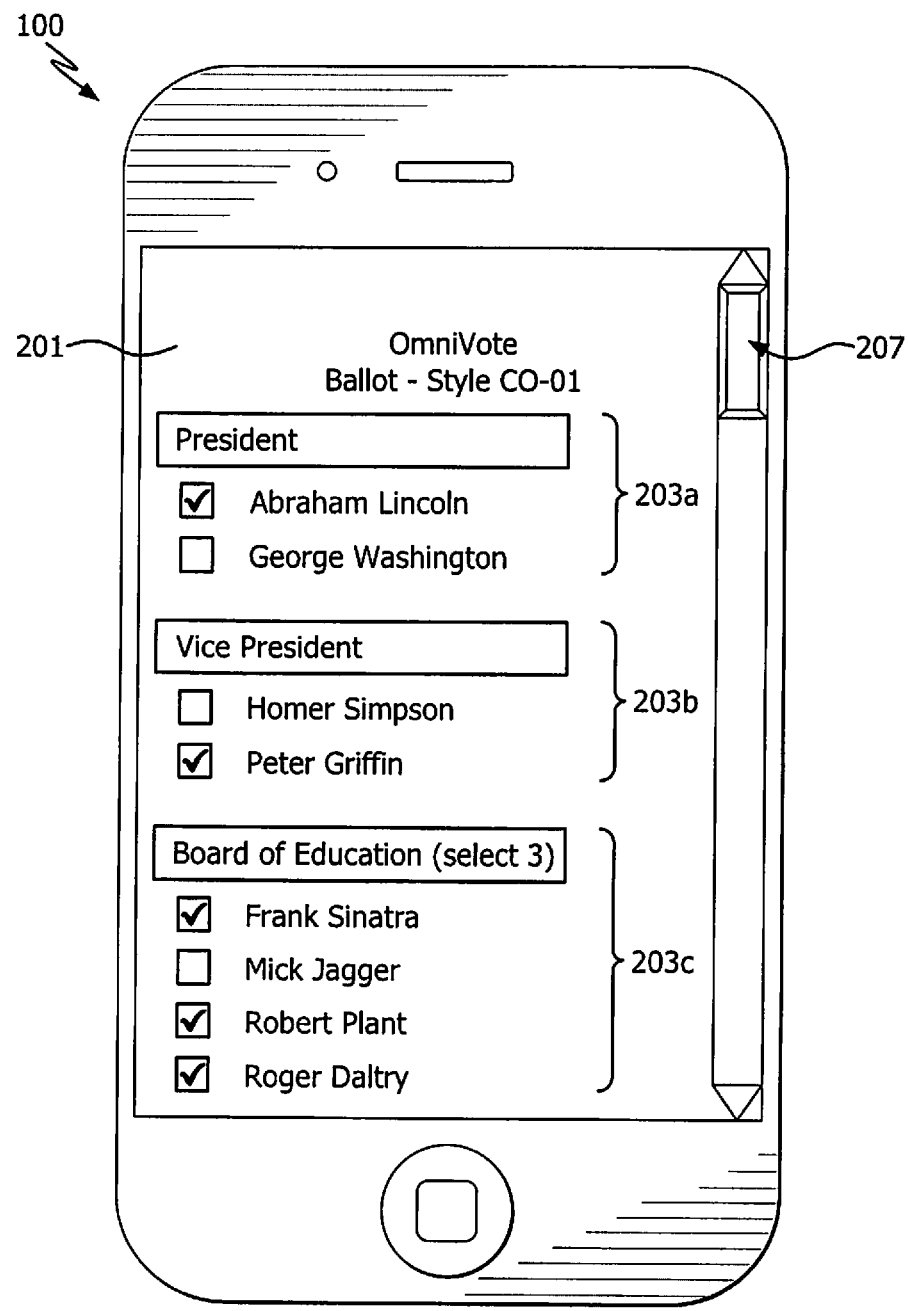
FIG. 3 illustrates a ballot completing interface showing a filled-in electronic ballot on a device according to an exemplary embodiment of the invention.
Figure 4:
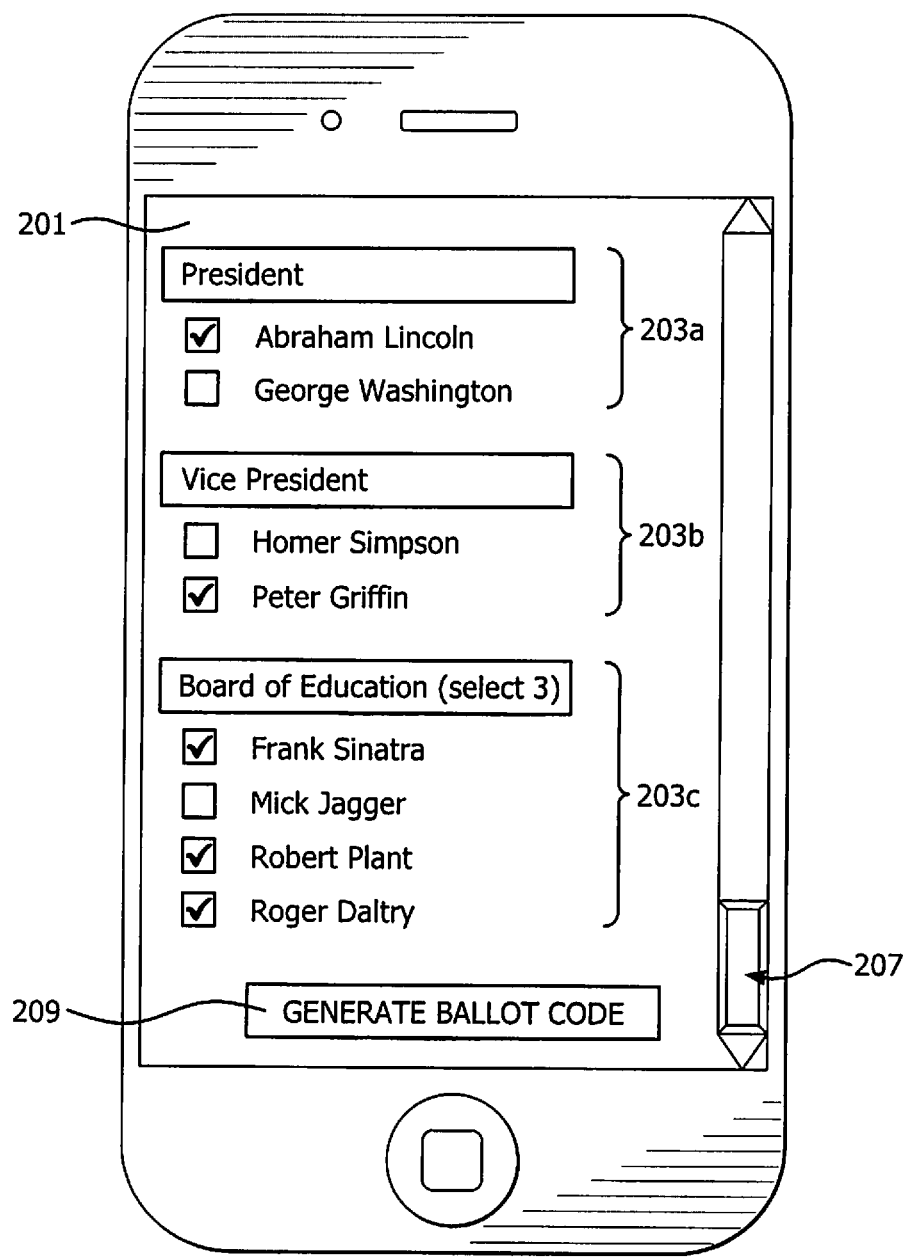
FIG. 4 further illustrates the ballot completing interface of FIG. 3.

An exemplary system according to an embodiment of the invention will now be described in connection with the figures. FIG. 1 illustrates a device and user interface according to an exemplary embodiment of the invention. A voter can advantageously access a ballot via any Internet enabled device. If ballots are different based on voter location, then the voter may enter information such as an address to obtain the ballot. Android, Apple OS, Microsoft Applications can be made available for any smart phone or tablet device running any suitable operating system, such as without limitation Android, Apple iOS, or Microsoft Windows Mobile, to provide the functionality described below. In addition, the functionality described below can simply be provided by appropriate coding on a website that is accessible by the device. Advantageously, in the embodiment described below there are no restrictions on ballot access. An interactive device 100, such as a smart phone, or the like, runs an application and provides a user interface 102 to a user. As illustrated, the user interface provides inputs 104a-104d for certain types of information which may be used to retrieve an appropriate ballot for the user. In the example shown, the inputs include name 104a, address 104b, poll site 104c and voter ID 104d. These may be used individually or in any combination to retrieve an appropriate ballot for the user, and the types of information shown are merely illustrative and should not be considered limiting. As an example, the user could enter their voter ID 104d and the device 100 could look up an appropriate ballot for the user based on their voter ID. A "retrieve ballot" button 104e is provided. Once the user enters information into one or more of the inputs 104a-104d, they can select the "retrieve ballot" button 104e, and the device 100 and application running on the device can utilize a network communication to submit the information provided by the user, and retrieve a ballot based on the information. The ballot is preferably electronically assigned a random number FIG. 2 illustrates an exemplary user interface 201 on the interactive device 100 for filling out a ballot. As illustrated, a number of positions 203a, 203b, 203c or questions are presented to the user with selectable options 205a-h for each. Any voter can access a selectable list of positions and responses (a "ballot") from a website or application. As illustrated in FIG. 3, the ballot is marked by the voter by, for example, using the touchscreen to select or unselect choices 205a-205h. Advantageously the voter can take as much or as little time as they want to mark the ballot, and if the interactive device 100 is a mobile device then they can work on the ballot wherever they desire. The voter need not be in a polling place. The voter can preferably change, discard the ballot, can fill out a different ballot on a different device any time. Of course the number of choices, or ballot logic, would preferably be embedded into the application or website. This would prevent "over voting", and could warn voters regarding "under voting", which is generally not done on current electronic voting systems because of the effect on voting efficiency. The user interface may include an optional scroll bar interface 207 to indicate that more positions or questions are available than fit onto the screen, and permitting the user to scroll among all of the questions and positions. The user interface also preferably includes a generate ballot interface 209 (See FIG. 4), such as a button.

Figure 5:
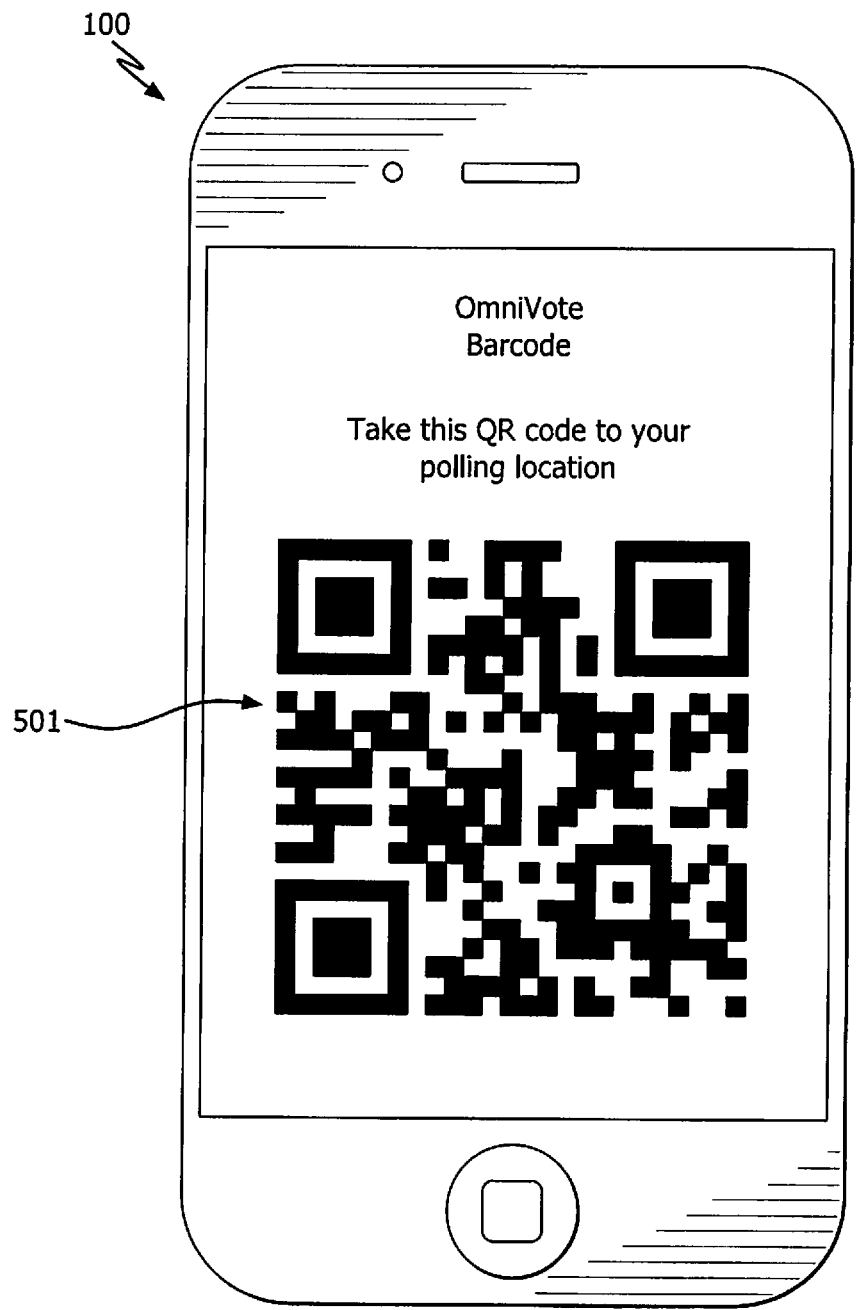
FIG. 5 illustrates a QR code generated on a device according to an exemplary embodiment of the invention.

When the voter is satisfied with their ballot, he/she presses the button 209, which generates a code based on the ballot selections made by the user. FIG. 5 illustrates an exemplary code 501 generated by an embodiment of the present invention. The code is preferably a two dimensional bar code, such as a QR code. The code preferably obscures the vote selections to maintain the privacy and anonymity of the voter and the voter's selections. The code may embody the vote selections directly, or indirectly, such as containing a reference to a stored set of selections located on a different device, such as an internet connected web server. The bar code is preferably generated to a screen, such as the screen of a mobile interactive device 100, but may also simply be printed on paper. The bar code data preferably contains or references a ballot type (the available positions and choices available to that voter with other data such as precinct, etc), and the list of positions and responses chosen by the voter. The information embedded in or referenced by the code should not and preferably cannot identify the voter.

The bar code also contains a random number which is generated either at the time the ballot is obtained, or at the time that selections are rendered as the bar code referenced above.

Figure 6:
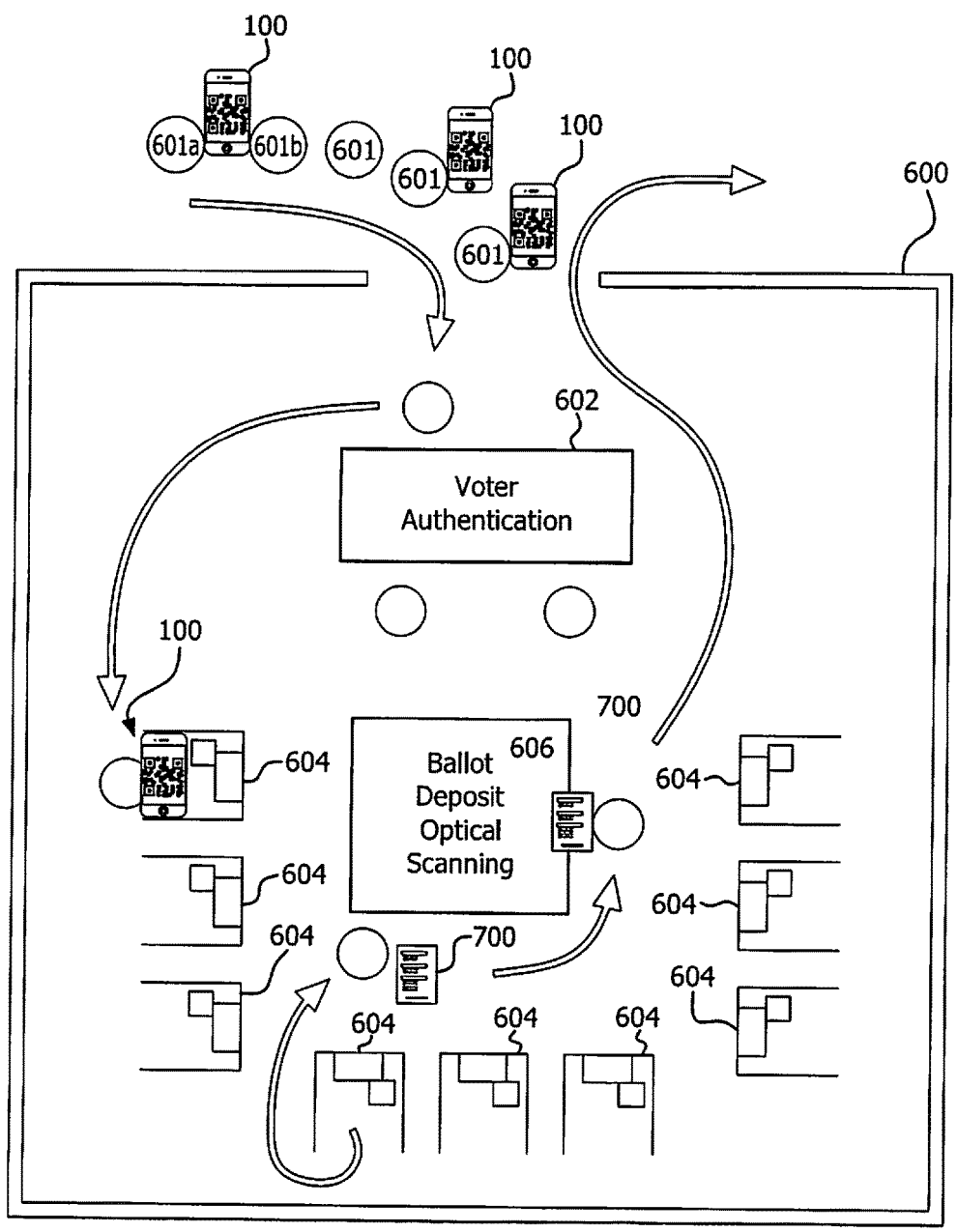
FIG. 6 illustrates a system of voting at a polling place according to an exemplary embodiment of the invention.

FIG. 6 illustrates an exemplary polling location 600 and the use of an interactive device 100 to expedite voting according to an exemplary embodiment of the invention. Voters 601 line up outside the polling location. As illustrated, some voters advantageously have an interactive device 100 with a code already generated, the code embedding or referencing their pre-made selections. It should be appreciated that each voter may take an interactive device, or a code printed on paper. In some jurisdictions interactive devices such as mobile phones are not permitted within the polling location, so a printed code may be preferred in these jurisdictions.

The voters check in at an authentication station 602, where poll workers can verify the voter's identity and eligibility to vote. Voter verification and check-in may be performed in any manner sufficient for the jurisdiction, and may eventually be migrated to a biometric check. Voters are then directed to a "voting machine" 604.

The "voting machine" may be nothing more than a computer with a peripheral bar code reader and an attached printer, and optionally attached imaging scanner. The voting machine 604 preferably comprises a code reader (not shown). Accordingly, the voter 601 displays the code from their interactive device 100 or paper QR code to the voting machine, and the voting machine retrieves and renders them to generate a paper or electronic ballot. The voter then preferably has an opportunity to review the paper or electronic ballot to confirm the vote selections match their intentions, before casting the ballot. It should be understood that terms like "voter receipt" and "voted ballot" and the like may be used interchangeably, and should broadly be interpreted to mean any item having markings to indicate a voter's intent with regard to vote selections. If the ballot is paper the digital QR code is preferably printed on the ballot, which contains the choices and the random number previously assigned to the ballot. It is also possible to add a second element to the random number so that only the paper ballot may be accepted.

To "cast" the ballot, the voter either moves to a second computer which also has an attached bar code reader, or switches the computer interface to allow the voter to accept the printed or electronic ballot. The acceptance is preferably accomplished by reading the bar code on the ballot. The voter then deposits the paper ballot 700 at a ballot deposit station 606. The ballot acceptance can activate an imaging scanner, to take a digital picture of the printed, human readable paper. The picture can either be independently "read" using mark recognition software, and/or using the 2D QR code printed on the ballot, or may be deposited in a secure ballot box before exiting the polling location. Because the user advantageously pre-selected their candidates and choices, the voting process is expedited, while the voter still has the opportunity to review selections in the privacy of the voting machine before accepting and casting their votes.

Figure 7:
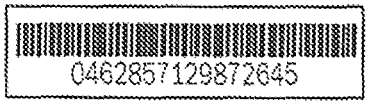
FIG. 7 illustrates a printed ballot showing selected votes and a bar code according to an exemplary embodiment of the invention.

FIG. 7 illustrates another exemplary ballot generated by an embodiment of the present invention. In this case, a paper ballot, which acts as a voter verifiable receipt 700 is generated. As illustrated, the positions and final selections are printed along with a machine readable code 701 identifying the selections on the voted ballot plus a random ballot number (the same random number discussed above). The paper ballot or verified receipt 700 is deposited at the polling location as a record of the voter's selections. The selections are both preferably human readable as well as machine readable so that the voter may review the recorded votes and be satisfied that their intended selections were properly recorded, and for archival purposes. The paper ballot and voter verified receipt 700 is kept as part of the permanent record of the election to provide transparency to the process.

If a voter is dissatisfied with the verifiable paper ballot receipt 700, the voter or authorized poll worker can use the machine readable QR code to reverse the electronic votes associated with the ballot. The paper ballot receipt 700 is then preferably destroyed, and the voter can go back to his interactive device to correct his vote, or to another interactive station provided on site by the election authority and fill out a new, or revise the old ballot electronically on the interactive device, regenerate the bar code and print the new paper ballot to their satisfaction.

A culling of electronic records preferably occurs at the end of the process that eliminates electronic records from a count unless each one correlates to a record captured from a paper voter verified ballot. Similarly, a check can be made of paper ballots that have no electronic counterpart.

Printed ballots or voter verified receipts may be processed through an optical scanner that records an image of the ballot and reads the choices on the marked form. The electronic count should match the scanned paper count. The paper count can advantageously be audited using either TrueBallot's TrueReview system, or any other suitable auditing system. Images can be used for any other legitimate purpose.

Figure 8:
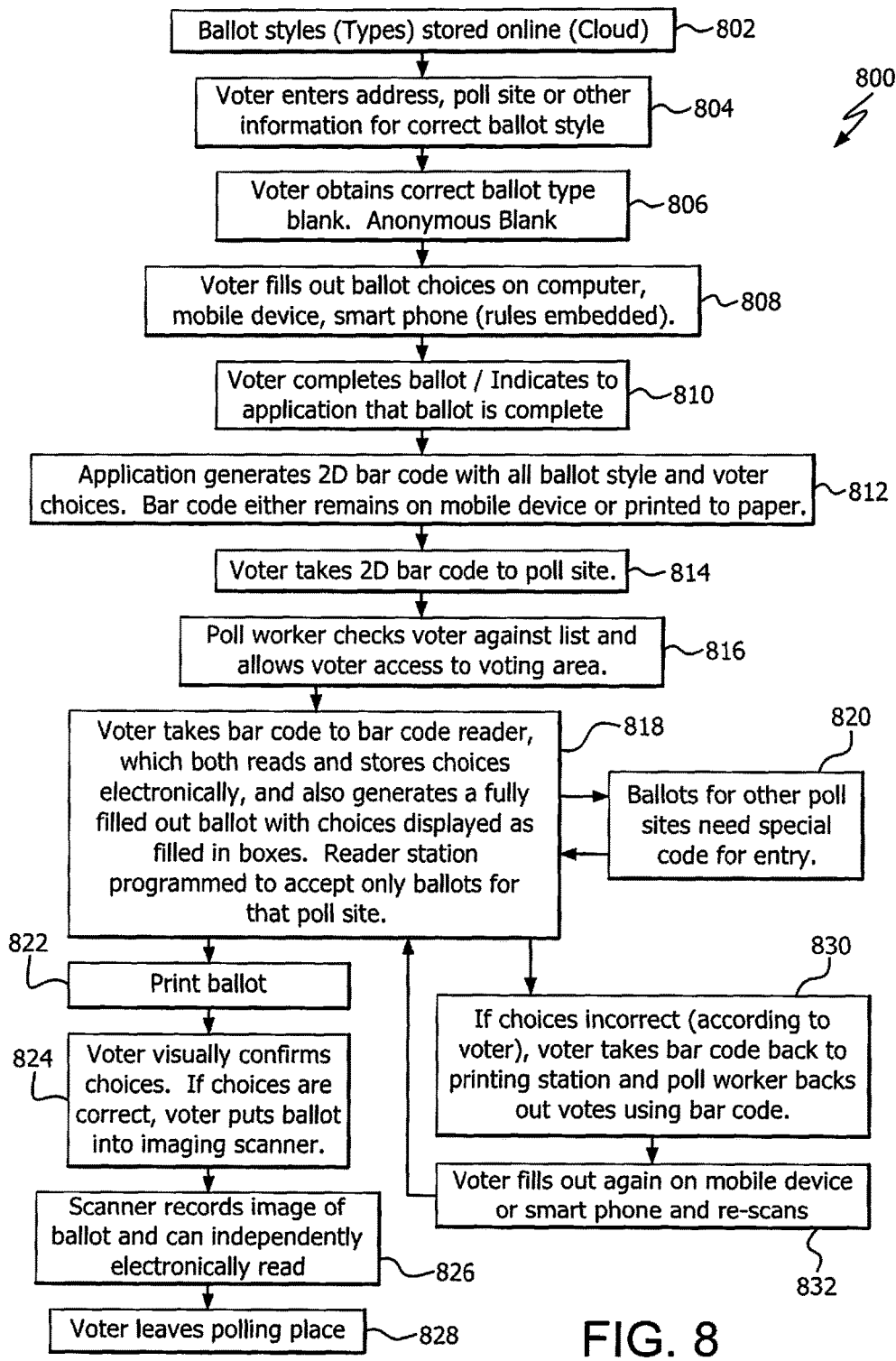
FIG. 8 illustrates a method of voting according to an exemplary embodiment of the invention.

A method 800 according to an exemplary embodiment of the invention is illustrated in FIG. 8. At step 802, ballot styles, including any combination of ballot types and combinations of positions or questions are stored, preferably online, such as on a webserver or cloud storage. At step 804, voters provide information to the system so that the correct ballot style may be provided to the voter. Information may include, but is not limited to, voter address, poll site, or any other suitable information. At step 806, an anonymous ballot type blank is delivered to the voter. At step 808, the voter fills out the ballot choices on an electronic device, such as a computer, mobile device, smart phone, or the like. At step 810, after reviewing their selections and being satisfied that they are complete, the voter completes the ballot, such as by clicking a button on the computer or mobile device app. At step 812, the system generates a code, preferably a two-dimensional code such as a QR code, and the code is either stored and displayed on the mobile device, or printed to paper. At step 814, the voter takes the generated code to their polling place. At step 816, a poll worker checks in the voter and verifies their identity and eligibility to vote. At step 818, the voter takes their code (printed or displayed) to a voting machines quipped with a code reader. The voting machines reads the code and generates a completed ballot with the same voter selections used to generate the code. At step 820, the voting machines optionally verifies that the code is associated with the particular polling location. If not, additional measures may be provided, such as a poll working entering a special code to permit the ballot to be received at this polling location. The voting machine prints a human readable and voter verifiable paper ballot at step 822. The voter can review the selections again on the printed ballot. If they are satisfied, the process continues at step 824, and the voter electronically accepts the ballot via the QR or similar machine readable code printed on the ballot. The voter may then run the ballot through an imaging scanner. The scanner records the printed ballot receipt image and both preferably independently reads and records the vote selections at step 826, and alternatively can be read using a QR code printed on the paper. The voter can then leave the polling location at step 828. If the voter was not satisfied that the printed ballot receipt reflected their voting intent, then the method proceeds to step 830, and the voter takes the printed paper ballot/voter verified receipt to a station or poll worker, and reverses the ballot, and permits the voter to go to a voting station or return to his interactive device. At step 832, the voter corrects or fills out the ballot again on the voting station, or on their mobile device, and when done, renders the QR code again and displays their QR code at the voting machine and begins again the process of conforming the vote selections, and printing a printed ballot receipt. From here the method returns to step 818.

Embodiments of the present invention provide several advantages over conventional voting systems. It should be understood that using a system as described above, recounts can advantageously include any combination of electronic, image, or hard copy voting records. The voting results can be audited, such as using TrueBallot's TrueReview auditing process. Voting results can be audited using the ballot images, which can be reprocessed using different software and verified. Voting results can be audited or recounted using the paper ballots themselves by reacquiring ballot images or re-reading paper ballots with a different system. Paper ballot receipts can be counted by hand. Scanned paper ballot receipt images can be viewed on the web and crowd sourced for accuracy and transparency. Because the system as described above renders marks onto the paper ballot receipt from the ballot data there will be no variation in ballot marking techniques. The electronic nature of the ballot form rendering will all but eliminate ballot reading and processing errors.

While the invention herein disclosed has been described by means of specific embodiments and applications thereof, it should be appreciated that numerous modifications and variations could be made thereto by those skilled in the art without departing from the scope of the invention, which is set forth in the appended claims.

What is claimed is:

1. A system for voting comprising:
   an interactive device adapted to receive voter information, and to retrieve a ballot based on said voter information, the ballot comprising a plurality of votable positions or questions, each votable position or question having two or more selection possibilities, and to display said ballot on a display of said interactive device;
   said interactive device further comprising a user interface adapted to receive input from a user to select a set of selections from said selection possibilities;
   the user interface further comprising an interface element to submit said set of selections;
   the interactive device adapted to generate a machine readable vote selection code based on said set of selections when said set of selections is submitted by a user;
   the interactive device further adapted to output the generated vote selection code; and
   a voting machine adapted to receive said generated code, to decode said generated vote selection code, and to retrieve the set of selections based on said decoded vote selection code;
   the voting machine further comprising a display adapted to display said set of selections in a votable ballot, and a user interface adapted to permit the user to modify the selections and to cast the ballot.

2. The system for voting of claim 1, wherein the machine readable vote selection code is a two dimensional code.

3. The system of voting of claim 1, wherein the machine readable vote selection code is a QR code.

4. The system for voting of claim 1, further comprising a printer for printing the generated machine readable vote selection code onto paper.

5. The system for voting of claim 1, wherein said interactive device comprises a display and the machine readable vote selection code is output to the display.

6. The system for voting of claim 1, wherein said voting machine is further adapted to print a human readable voting receipt indicating the voter's selections.

7. The system for voting of claim 6, wherein the voting receipt further comprises a unique number and a receipt code representing the voter's selections.

8. The system for voting of claim 1, wherein the vote selection code comprises data representing vote selections.

9. The system for voting of claim 1, wherein the vote selection code comprises a reference to a remotely stored data element that comprises the vote selections.

10. A voting device comprising:
    a user interface adapted to receive voter information, and to retrieve a ballot based on said voter information, the ballot comprising a plurality of votable positions or questions, each votable position or question having two or more selection possibilities, and to display said ballot on a display of said voting device;
    said user interface adapted to receive input from a user to select a set of selections from said selection possibilities;
    the user interface further comprising an interface element to submit said set of selections;
    the voting device adapted to generate a machine readable code based on said set of selections when said set of selections is submitted by a user;
    the voting device further adapted to output the generated code.

11. The voting device of claim 10, wherein the machine readable code is a two dimensional code.

12. The voting device of claim 10, wherein the machine readable code is a QR code.

13. The voting device of claim 10, further comprising a communication interface for transmitting the machine readable code and the data contained therein to a computer and to a printer for printing the machine readable code to paper as a human readable ballot.

14. The voting device of claim 10, further comprising a display, wherein the machine readable code is output to the display showing the data stored in such code.

15. A method of voting comprising the steps of:
    receiving voter information via a user interface of a voting device;
    retrieving ballot style information based on the received voter information, the ballot style comprising a set of positions and/or questions, each having one or more selection options;

generating a ballot based on the retrieved ballot style;
receiving a set of user selections related to the positions and/or questions on the generated ballot;
generating a machine readable vote selection code based on said received set of user selections;
outputting said machine readable vote selection code.

16. The method of claim 15, wherein the outputting step comprises displaying the machine readable vote selection code on a display of the voting device.

17. The method of claim 15, wherein the outputting step comprises transmitting the machine readable vote selection code to a printer to be printed on paper.

18. The method of claim 15, wherein the generated machine readable vote selection code is a two dimensional code.

19. The method of claim 15, wherein the generated machines readable vote selection code is a QR code.

20. The method of claim 15, further comprising displaying the machine readable vote selection code to a vote casting machine in a polling location.

21. The method of claim 20, further comprising reading and decoding the machine readable vote selection code, and
generating a filled-in ballot on the vote casting machine based on the decoded vote selection code and outputting the filled in ballot to paper.

22. The method of claim 15, wherein the vote selection code comprises data representing the voter's selection.

23. The method of claim 15, wherein the vote selection code comprises a reference to a remotely stored data element comprising the voter's selections.

* * * * *